No. 776,398. PATENTED NOV. 29, 1904.
J. E. HUFFMAN.
GATE LATCH.
APPLICATION FILED JULY 7, 1904.
NO MODEL.
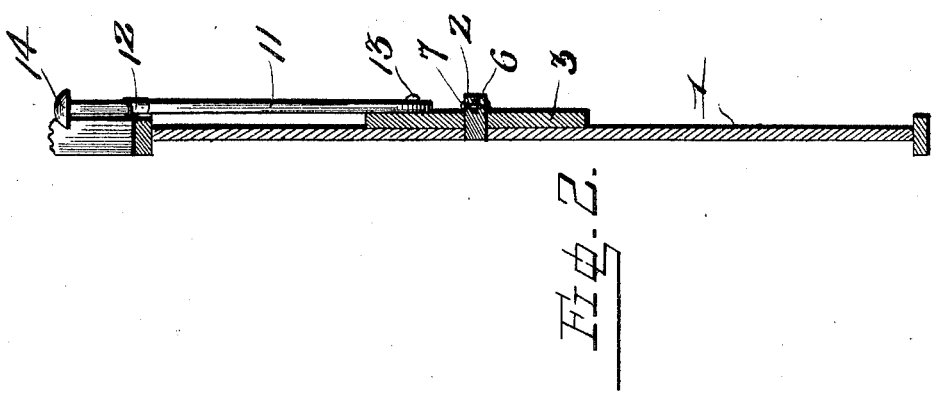
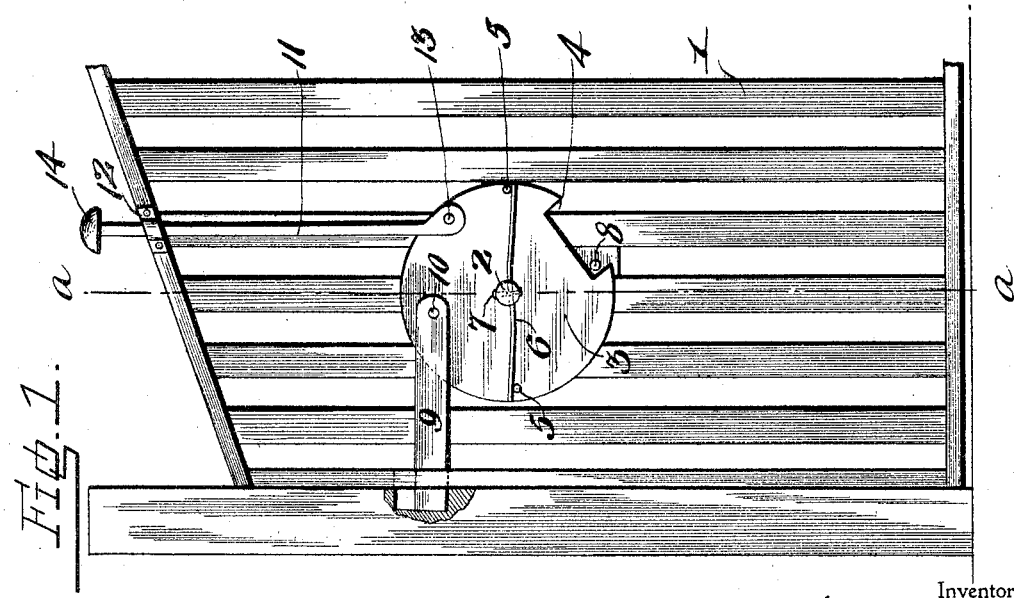
Witnesses
Jas A. Koehl.
Inventor
J. E. Huffman
By H. R. Wilson
Attorney No. 776,398. Patented November 29, 1904.

UNITED STATES PATENT OFFICE.

JAMES E. HUFFMAN, OF KIRBYVILLE, TEXAS.

GATE-LATCH.

SPECIFICATION forming part of Letters Patent No. 776,398, dated November 29, 1904.

Application filed July 7, 1904. Serial No. 215,633. (No model.)

*To all whom it may concern:*

Be it known that I, JAMES E. HUFFMAN, a citizen of the United States, residing at Kirbyville, in the county of Jasper and State of Texas, have invented certain new and useful Improvements in Gate-Latches; and I do declare the following to be a full, clear, and exact description of the invention, such as will enable others skilled in the art to which it appertains to make and use the same.

My invention is an improved gate-latch; and it consists in the construction, combination, and arrangement of devices hereinafter described and claimed.

The object of my invention is to provide a simple, cheap, durable, and effective gate-latch which is not likely to get out of order and which may be very readily repaired at slight cost when necessary.

In the accompanying drawings, Figure 1 is an elevation of a gate-latch embodying my improvements, showing the same in operative position on a gate. Fig. 2 is a sectional view of the same, taken on the plane indicated by the line $a\ a$ of Fig. 1.

The gate 1, which may be of any suitable construction, is provided at a suitable distance from its free end with a suitably-supported axle-spindle 2, on which a circular disk 3 is mounted for partial rotation. The said disk has a notch 4 of suitable length in its periphery, and is provided with a pair of oppositely-disposed studs 5 near its periphery and which project from one of its faces. A spring-bar 6 is disposed transversely on the outer side of the disk, passes through an opening in the spindle, and is secured to the latter by a pin 7, as shown. The free ends of the spring-bar bear against opposite sides of the studs 5. The gate is provided with a stop-stud 8, which coacts with the ends of the notch to limit the movement of the disk on the spindle. A bolt 9, which is suitably guided in the gate and is adapted to be moved longitudinally to project from the free end of the gate or to be drawn inwardly into the same, has its inner end pivotally connected to the disk, as at 10. Hence a partial rotation of the disk in one direction against the tension of the spring-bar will cause the bolt to be drawn inwardly, while the spring will serve to return the disk to its original position, and thereby move the bolt outwardly to the position shown in Fig. 1. In order to operate the disk against the tension of the spring-bar, I provide a rod 11, the upper portion of which is suitably guided in the gate, as at 12, and the lower portion of which is pivotally connected to the disk, as at 13. At the upper end of the operating-rod is a knob or enlarged head 14. It will be understood that by depressing the rod the disk will be turned to withdraw the bolt and that when the pressure is released from the rod the spring-bar will return the same to its normal position and will by partially turning the disk move the bolt outwardly into locking position.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of the invention.

Having thus described my invention, what I claim, and desire to secure by Letters Patent, is—

A gate-latch, comprising a disk mounted for partial rotation and provided with a notch in one side, a stop device coacting with the ends of the notch to limit the movement of the disk, a spring-bar extending from the pivot of the disk and coacting with a stud with which the disk is provided to normally turn the disk in one direction and retain it in one position, an operating-rod attached to the disk and serving to turn the disk against the tension of the spring when said operating-rod is depressed, and a bolt movable longitudinally and pivotally connected to the disk, substantially as described.

In testimony whereof I have hereunto set my hand in presence of two subscribing witnesses.

JAMES E. HUFFMAN.

Witnesses:
R. C. MYERS,
F. R. TYLER.